United States Patent [19]
Williams

[11] Patent Number: 5,825,754
[45] Date of Patent: Oct. 20, 1998

[54] FILTER AND PROCESS FOR REDUCING NOISE IN AUDIO SIGNALS

[75] Inventor: Errol R. Williams, Round Rock, Tex.

[73] Assignee: VTEL Corporation, Austin, Tex.

[21] Appl. No.: 580,176

[22] Filed: Dec. 28, 1995

[51] Int. Cl.$^6$ .............................. H04B 3/20; H04M 9/08
[52] U.S. Cl. .................... 370/290; 379/406; 379/416; 370/269; 370/286; 370/289; 395/2.42
[58] Field of Search .................. 381/94, 66; 379/390, 379/410, 406, 411, 414, 415, 416; 370/289, 260, 268, 269, 286, 287, 290, 291; 395/2.42, 2.35, 2.36, 2.37

[56] References Cited

U.S. PATENT DOCUMENTS

| | | | |
|---|---|---|---|
| 3,585,311 | 6/1971 | Berkley et al. | 379/406 |
| 4,362,909 | 12/1982 | Snijders et al. | 370/289 |
| 4,433,435 | 2/1984 | David | 381/94 |
| 4,630,304 | 12/1986 | Borth et al. | 381/94 |
| 4,630,305 | 12/1986 | Borth et al. | 381/94 |
| 4,932,063 | 6/1990 | Nakamura | 381/94 |
| 4,956,838 | 9/1990 | Gilloire | 370/291 |
| 5,001,701 | 3/1991 | Gay | 370/290 |
| 5,201,004 | 4/1993 | Fujiwara et al. | 395/2.42 |
| 5,274,705 | 12/1993 | Younce et al. | 379/410 |
| 5,305,307 | 4/1994 | Chu | 370/288 |
| 5,544,250 | 8/1996 | Urbanski | 381/94 |
| 5,548,642 | 8/1996 | Diethorn | 379/410 |
| 5,561,668 | 10/1996 | Genter | 370/288 |
| 5,563,944 | 10/1996 | Hasagawa | 379/410 |
| 5,566,167 | 10/1996 | Duttweiler | 370/290 |

*Primary Examiner*—Krista Zele
*Assistant Examiner*—Scott Wolinsky
*Attorney, Agent, or Firm*—Baker & Botts, L.L.P.

[57] ABSTRACT

A noise reduction filter (28) is provided. The noise reduction filter (28) comprises a signal analysis block (30). The signal analysis block (30) is operable to receive an input audio signal and to determine a short term signal level. A noise floor block (32) is coupled to the signal analysis block (30). The noise floor block (32) is operable to receive the short term signal level from the signal analysis block (30) and to determine a noise floor level based upon the value of the short term signal level. A noise factor block (34) is coupled to the signal analysis block (30) and to the noise floor block (32). The noise factor block (34) is operable to receive the short term signal level and the noise floor level and operable to calculate a noise factor. A multiplier node (36) is coupled to the noise factor block (34) and receives the input audio signal. The multiplier node (36) is operable to multiply the input audio signal by the noise factor and to provide a noise reduced output signal as an output of the noise reduction filter (28).

18 Claims, 3 Drawing Sheets

FILTER AND PROCESS FOR REDUCING NOISE IN AUDIO SIGNALS

TECHNICAL FIELD OF THE INVENTION

This invention relates in general to the field of electronic systems, and more particularly to a filter and a process for reducing noise in audio signals.

BACKGROUND OF THE INVENTION

In multipoint conferencing systems, background noise at a conference site caused by air-conditioning systems, blowers, computers, and other noise sources is often captured by the microphones located in the conference site. This background noise may then be transmitted to a far-side conference site. This noise when received at the far-side conference site can cause a loss of intelligibility and fatigue to participants. It is advantageous to remove the noise from the audio signal thereby allowing the conferencing system to perform better in a wide range of environments and conditions.

Conventional solutions to the problem of background noise include the use of additional microphones in the noisy conference site with each microphone having lower sensitivity. Each participant in the conference site then takes a position very close to one of the microphones. Another conventional solution is a noise gate or gated microphone. In such a microphone, the audio channel is shut off when the microphone signal power is less than an arbitrary threshold.

An additional conventional solution is spectral subtraction. In this method, the audio signal is converted to the frequency domain using Fourier transforms. A small amount of the signal level, usually equivalent to the noise floor, is then subtracted from each frequency bin, and the signal is converted back to the time domain. This technique works well with random noise, but can require a relatively large amount of processing power. Similarly, the use of an adaptive filter works well with periodic noise but can also require a large amount of processing power.

A further conventional solution to the problem of background noise is the use of downward expansion of the audio signal. In general, downward expansion uses a short-term strength of the audio signal from which a multiplying factor can be derived. The noisy signal is multiplied by this factor to cause an apparent reduction in noise. The factor can be unity when the signal strength is above an arbitrary threshold. A smaller signal strength can produce a non-linearly decreasing multiplying factor. The result is that when an input audio signal is small, the signal is made even smaller, and when the input audio signal is large, the signal is not altered. Since the background noise level is often much less than the signal level when a conference participant is speaking, this solution attenuates the signal at those points when only noise is present. When voice is present and the signal is larger, the signal passes unaltered. The result is that during pauses in speech, the filter attenuates the noise, and during speech, the noise is masked by the voice. This technique has the advantage of requiring little processing power and can be effective in many conference room environments.

However, this downward expansion technique can suffer from a number of disadvantages. One disadvantage is that when the background noise exceeds the threshold, the background noise can still be heard by the far-side conference site even when no speech is present. An additional disadvantage is that the background noise remains present during speech and may make the speech sound "scratchy" depending on the relative strength of the noise and the speech. Further, if the speech is quiet, it may fall below the threshold and be attenuated along with the background noise.

SUMMARY OF THE INVENTION

In accordance with the present invention, a filter and a process for noise reduction in audio signals are provided that substantially eliminate or reduce disadvantages and problems associated with previously developed methods of noise reduction.

According to one embodiment of the present invention, a noise reduction filter is provided. The noise reduction filter comprises a signal analysis block. The signal analysis block receives an input audio signal and determines a short term signal level. A noise floor block is coupled to the signal analysis block. The noise floor block receives the short term signal level from the signal analysis block and determines a noise floor level based upon the value of the short term signal level. A noise factor block is coupled to the signal analysis block and to the noise floor block. The noise factor block receives the short term signal level and the noise floor level and calculates a noise factor. A multiplier node is coupled to the noise factor block and receives the input audio signal. The multiplier node multiplies the input audio signal by the noise factor and provides a noise reduced output signal as an output of the noise reduction filter.

According to another embodiment of the present invention, a multi-band echo-canceller filter with noise reduction is provided. In the filter, a near-side analysis filter receives an input from a near-side conference site and separates it into a number of frequency bands. A far-side analysis filter receives an input signal from a far-side conference site and separates it into an equal number of frequency bands. A plurality of summation nodes receive associated output bands of the near-side analysis filter. Each summation node is subtracts a second input from the associated output band. A plurality of echo canceller filters receive an associated output band of the far-side analysis filter. Each echo canceller filter also receives the output of an associated summation node, determines echo present, and provides the second input of the associated summing node. A plurality of noise reduction filters receive the output signal of an associated summation node. Each noise reduction filter processes the output signal and provides a noise reduced output signal. A synthesis filter receives the noise reduced output signal of each noise reduction filter and recombines them to provide an output audio signal to a far-side conference site.

A technical advantage of the present invention is the provision of a low cost, high performance process and filter for removing background noise from audio signals. This process and filter is especially beneficial to multipoint video conferences because it often can be incorporated into existing audio sub-system firmware. The present invention provides an improvement in audio performance at conference sites and allows greater variety of microphones to be used in noisy environments.

Another technical advantage of the present invention is the application of a noise reduction filter to each band in a multi-band echo-canceller filter. Conventional multi-band echo canceller filters are relatively well-known and operate to separate the audio signal into narrow frequency bands with each band having its own echo canceller. The present invention provides further processing of each frequency band to reduce noise present in that band prior to recombination of the frequency bands for the output audio signal.

Additionally, each noise reducing filter acts independently of the others. This results in the "scratchy" sounding voice problem being greatly reduced because background noise passes unattenuated only in the frequency ranges where the speech signal has the greatest energy.

A further technical advantage of the present invention is the provision of a noise reduction filter and process that are adaptive to a changing background noise level and speech level within a conference site.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Figure 1:
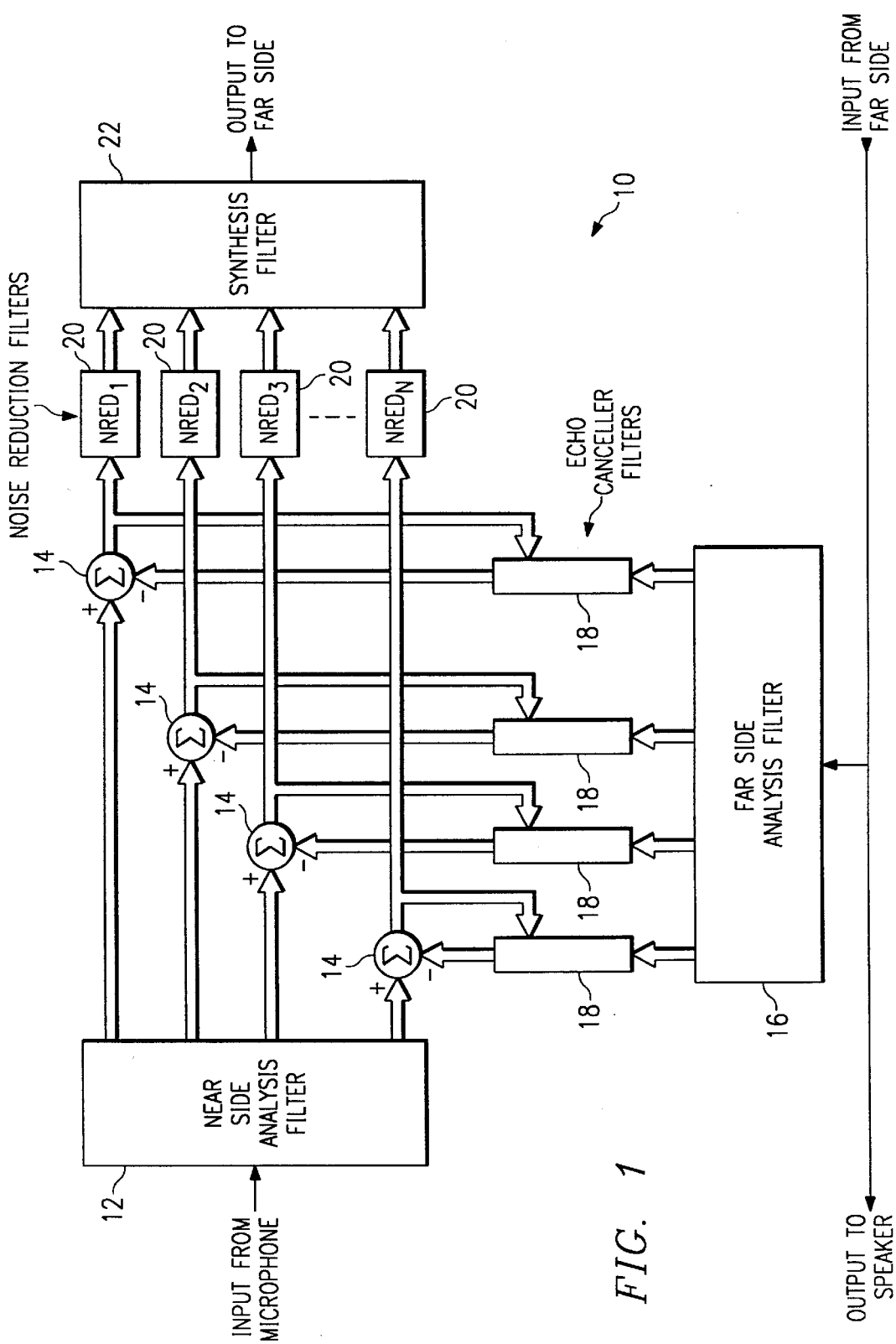
FIG. 1 is a block diagram of a multi-band echo-canceller filter with noise reduction constructed to the teachings of the present invention.

FIG. 1 is a block diagram of a multi-band echo-canceller filter, indicated generally at 10, constructed according to the teachings of the present invention. In the illustrated embodiment of the present invention, filter 10 is implemented in program code executed by a digital signal processor or other processor. It should be understood that this embodiment is not intended and should not be construed to limit the scope of the present invention.

Filter 10 receives input from a microphone positioned in a near-side conference site and receives input from a far-side conference site, as shown. A near-side analysis filter 12 receives the audio signal from the near-side conference site. Near-side analysis filter 12 splits the audio signal into multiple frequency bands and provides the frequency bands as outputs. The number of bands, N, can be selected as appropriate for the desired application. In one embodiment of the present invention, there are 32 frequency bands. Each output of near-side analysis filter 12 is received by a signal summation node 14.

A far-side analysis filter 16 receives the audio signal from the far-side conference site. Far-side analysis filter 16 splits the audio signal into multiple frequency bands and provides the frequency bands as output. The number of bands produced by far-side analysis filter 16 matches the number of bands produced by near-side analysis filter 12. Each output of far-side analysis filter 16 is received by an echo canceller filter 18. Each echo canceller filter 18 also receives an output provided by an associated summation node 14 and provides an output to the associated summation node 14, as shown.

Each one of a plurality of noise reduction filters 20 is coupled to an associated signal summation node 14. Each noise reduction filter 20 receives the output of the signal summation node 14 and provides an output. A synthesis filter 22 is coupled to noise reduction filters 20 and receives the outputs of noise reduction filters 20. Synthesis filter 22 combines the outputs thereby combining the multiple frequency bands and provides an output audio signal to the far-side conference site.

In operation, filter 10 receives an audio signal input from the near-side conference site as well as an audio signal input from the far-side conference site. Filter 10 then processes these audio signals to accomplish multi-band echo canceling and noise reduction. The audio signal output of filter 10, which is provided to the far-side conference site, is thereby both noise reduced and echo canceled.

Near-side analysis filter 12 is operable to split the audio signal received from the near-side microphone into multiple frequency bands. Far-side analysis filter 16 is similarly operable to split the audio signal from the far-side into multiple frequency bands. Each echo canceller filter 18 is operable to calculate echo in its frequency band. Echo canceller filters 18 compare the audio signal provided by far-side analysis filter 16 with the audio signal provided by an associated summation node 14 to determine whether there is echo present in the near-side signal. Echo canceller filters 18 then operate to provide an output that represents the echo present in the near-side audio signal. Audio summation nodes 14 are operable to receive the output of echo canceller filters 18 and subtract that output from the audio signals provided by near-side analysis filter 12.

Noise reduction filters 20 receive the output of an associated signal summation node 14. Each noise reduction filter 20 is operable to reduce noise present in the audio signal. In one embodiment of the present invention, noise reduction filters 20 comprise filters as shown in and described with respect to FIG. 2 and FIG. 3. Each noise reduction filter 20 provides a noise reduced audio signal as an output.

Synthesis filter 22 receives the noise reduced audio signals from noise reduction filters 20 and recombines them to provide a single audio signal as an output. The output audio signal of synthesis filter 22 is then provided to the far-side conference site.

A technical advantage of the present invention is the application of a noise reduction filter to each band in a multi-band echo-canceller filter. Conventional multi-band echo canceller filters are relatively well-known and operate to separate the audio signal into narrow frequency bands with each band having its own echo canceller. The present invention provides further processing of each frequency band to reduce noise present in that band prior to recombination of the frequency bands for the output audio signal.

Figure 2:
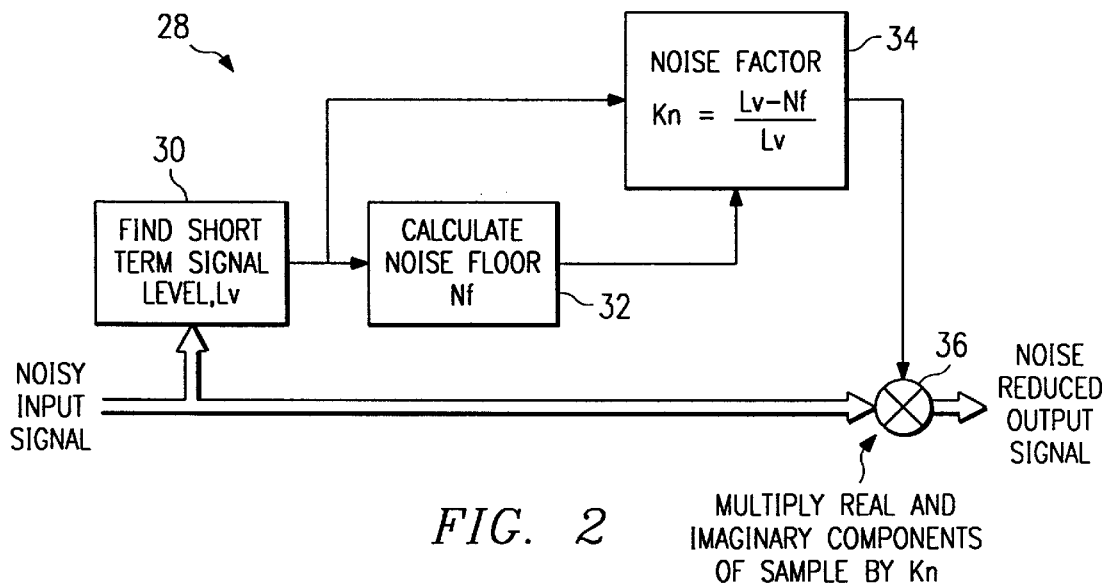
FIG. 2 is a block diagram of a noise reduction filter constructed according to the teachings of the present invention.
Figure 3:
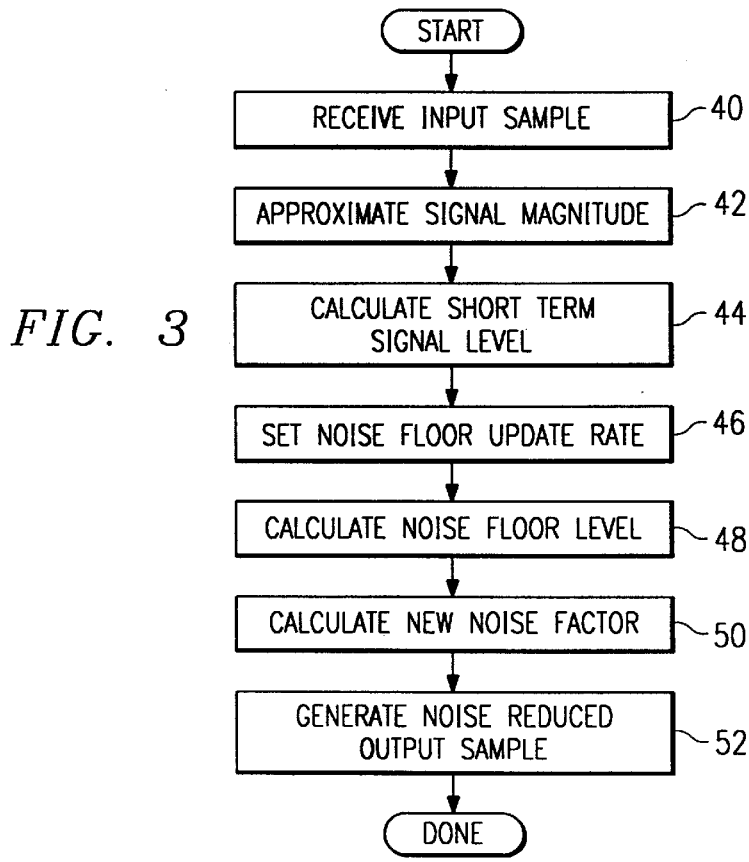
FIG. 3 is a flowchart of a process for reducing noise in audio signals according to the teachings of the present invention.

In one embodiment of the present invention, noise reduction filters 20 comprise filters as shown in FIG. 2 and FIG. 3 and have an adjustable threshold that adapts to the level of the background noise. In this embodiment, the short term signal level of the noisy audio signal is monitored to find a background noise level during pauses in speech. The noisy audio signal level is then scaled inversely to background noise level to provide an adaptive multiplying factor. When there is little background noise, the threshold represented by the background noise level is effectively decreased so that there is less attenuation of both voice and noise. On the other hand, when there is a high level of background noise, the threshold is effectively increased to attenuate the higher noise level.

A technical advantage of the present invention is that each noise reducing filter 20 acts independently of the others and only covers a frequency band of the audio signal. This results in the "scratchy" sounding voice problem being greatly reduced because background noise passes unattenuated only in the frequency ranges where the speech signal has the greatest energy.

FIG. 2 is a block diagram of a noise reduction filter, indicated generally at 28, constructed according to the teachings of the present invention. Noise reduction filter 28 receives a noisy input audio signal and provides a noise reduced output signal, as shown. One application of noise reduction filter 28 is in a multi-band filter as described with respect to FIG. 1.

Noise reduction filter 28 comprises a signal analysis block 30 which receives the noisy input signal. Signal analysis block 30 provides an output which is received by a noise floor block 32 and by a noise factor block 34. Noise floor block 32 also provides an output to noise factor block 34. Noise factor block 34 then provides an output to a multiplier node 36. Multiplier node 36, in turn, provides a noise reduced output signal, as shown.

In operation, noise reduction filter 28 receives the noisy input signal, calculates a noise factor, Kn, and multiplies the noisy input signal by the noise factor, Kn. Noise reduction filter 28 then provides the result of this multiplication as the noise reduced output signal.

Signal analysis block 30 operates to calculate a short term signal level, Lv, based upon an approximate signal magnitude of the noisy input signal. Noise floor block 32 then calculates a noise floor, Nf, using the short term signal level, Lv, and a comparison of that level versus prior noise floor calculations. Noise factor block 34 then uses the short term signal level, Lv, and the noise floor, Nf, in order to calculate a noise factor, Kn. As shown, in one embodiment of the present invention, the noise factor, Kn, is calculated by dividing the difference of the signal level and the noise floor (Lv−Nf) by the signal level (Lv).

Noise factor block 34 then provides the noise factor, Kn, to the multiplier node 36. Multiplier node 36 multiplies the real and imaginary components of the noisy input signal by the noise factor, Kn, and provides the result as an output. This output of multiplier node 36 is provided as the noise reduced output signal. By modifying the noise floor, Nf, using the short term signal level, Lv, noise reduction filter 29 adapts to changing background noise in the noisy input signal.

FIG. 3 is a flowchart of a process for reducing noise in audio signals according to the teachings of the present invention. One embodiment of noise reduction filter 28 operates according to the process of FIG. 3.

In step 40, the filter receives an input sample or audio signal, $X_k$. The input sample can comprise a complex input, and the "k" represents that it is the kth sample. In step 42, the signal magnitude, $|X_k|$, is approximated. In one embodiment, the signal magnitude is approximated as follows:

$$|X_k| \leftarrow abs(Re(X_k)) + abs(Im(X_k))$$

In step 44, a short term signal level, $Lv_k$, is calculated. In one embodiment, the short term signal level is calculated as shown below in which the signal level update rate, $\delta_L$, comprises a rate at which the signal level, $Lv_k$, is to be updated and which can be set according to desired system parameters.

$$Lv_k \leftarrow Lv_{k-1} + (=|X_k|-Lv_{k-1})\delta_L$$

In step 46, the noise floor update rate, $\delta_{nf}$, is set. In one embodiment, the noise for update rate is set based upon the short term signal level, $Lv_k$, and the prior noise floor level, $Nf_{k-1}$. In this embodiment, the noise floor update rate is set as follows:

if ($Lv_k > Nf_{k-1}$) then $\delta_{nf} \leftarrow \delta_{small}$, else $\delta_{nf} \leftarrow \delta_{large}$ The noise floor level, $Nf_k$ is then calculated in step 48. In one embodiment, the noise floor is calculated as follows:

$$Nf_k \leftarrow Nf_{k-1} + (Lv_k - Nf_{k-1})\delta_{nf}$$

In step 50, a new noise factor, $Kn_k$, is calculated using the short term signal level $Lv_k$ and the noise floor level, $Nf_k$. In one embodiment, the noise factor is calculated as follows:

$$Kn_k \leftarrow (Lv_k - Nf_k)/Lv_k$$

In step 52, the noise reduced output sample, $Xnr_k$, is generated. The output sample, $Xnr_k$, is generated by multiplying the input signal by the noise factor as shown below:

$$Xnr_k \leftarrow X_k Kn_k$$

The process of FIG. 3 is repeated at the desired sample rate to provide the noise reduced output sample to a far-side conference site. According to the present invention, the noise floor calculated in step 46 adapts to changing conditions of the input sample received in step 40. Further, in steps 46 and 48, updates to the noise floor are made at a smaller rate when the input signal is assumed to represent a speaker (i.e. $Lv_k$ is greater than $Nf_{k-1}$) and is updated at a higher rate when the input sample is assumed to represent background (i.e., $Lv_k$ is less than or equal to $Nf_{k-1}$).

Figure 4A:
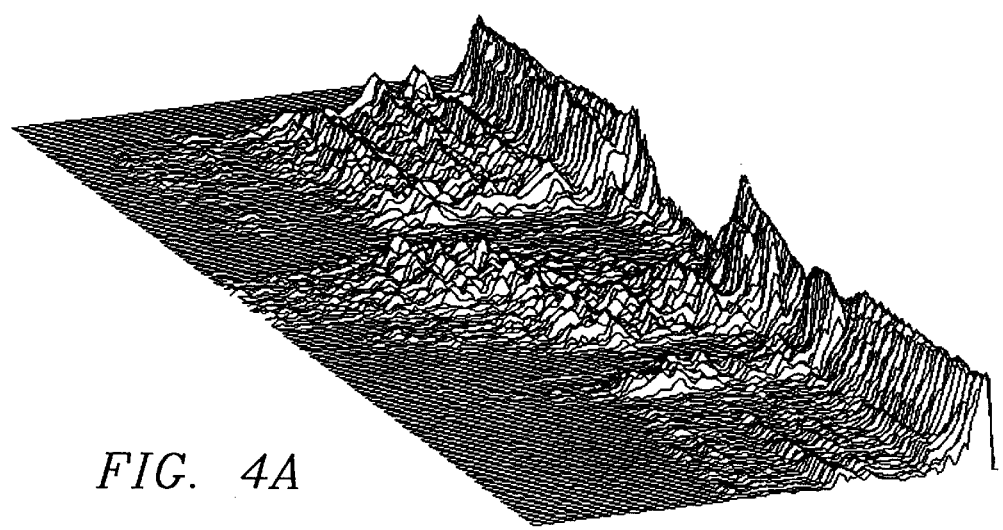
FIGS. 4A, 4B and 4C illustrate an original voice waveform, the original voice waveform with added noise, and a noise reduced waveform after processing by the multi-band filter of FIG. 1.
Figure 4B:
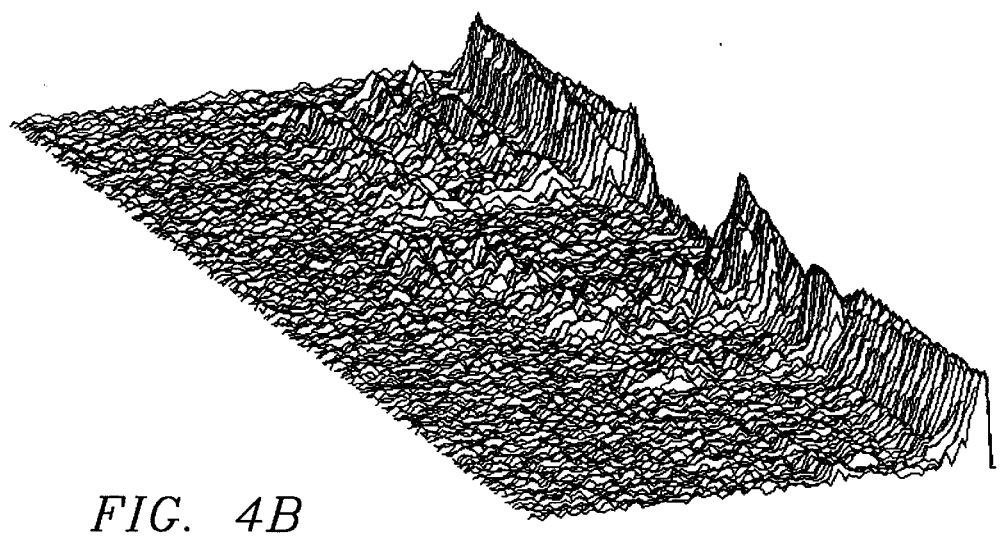
Figure 4C:
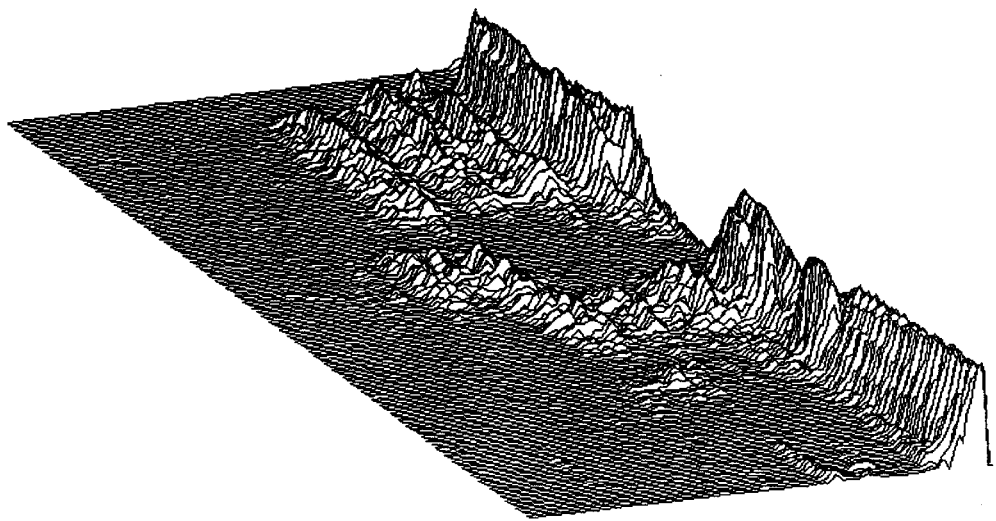

FIGS. 4A, 4B and 4C illustrate an original voice waveform, the original waveform with noise added, and a noise reduced waveform after processing by the filter of FIG. 1.

As shown in FIG. 4A, an original voice audio signal may have the waveform shown for a certain period of time. As can be seen, the voice waveform of FIG. 4A has characteristic peaks and valleys located at different points. Of course, it is the smaller amplitude areas with which background noise generally causes problems.

FIG. 4B shows the original voice waveform of FIG. 4A with added noise. As can be seen, the added noise is scattered and hides the smaller amplitude features of the original waveform of FIG. 4A. FIG. 4B represents the original voice audio signal contaminated by background noise.

FIG. 4C illustrates the results of processing the waveform of FIG. 4B by a multi-band echo canceller noise reduction filter as shown in FIG. 1 where each frequency band has an associated noise reduction filter constructed as shown in FIG. 2 and FIG. 3. As can be seen by comparing FIG. 4C to FIGS. 4A and 4B, the multi-band filter eliminates much of the added noise and produces an output waveform relatively close to the original voice waveform.

Although the present invention has been described in detail, it should be understood that various changes, substitutions and alterations can be made hereto without departing from the spirit and scope of the invention as defined by the appended claims.

What is claimed is:

1. A noise reduction filter, comprising:
   a signal analysis block, the signal analysis block operating to receive an input audio signal and to determine a short term signal level;

a noise floor block coupled to the signal analysis block, the noise floor block operating to receive the short term signal level from the signal analysis block and to determine a noise floor level based upon the value of the short term signal level;

a noise factor block coupled to the signal analysis block and to the noise floor block, the noise factor block operating to receive the short term signal level and the noise floor level and operating to calculate a noise factor; and a multiplier node coupled to the noise factor block and receiving the input audio signal, the multiplier node operating to multiply the input audio signal by the noise factor and to provide a noise reduced output signal as an output of the noise reduction filter.

2. The noise reduction filter of claim 1, wherein the signal analysis block operates to calculate a magnitude of the input audio signal by calculating an absolute value of a real and an imaginary portion of the input audio signal.

3. The noise reduction filter of claim 2, wherein the signal analysis block operates to calculate the short term signal level as a sum of a prior short term signal level and a scaled difference between the magnitude of the input audio signal and the prior short term signal level.

4. The noise reduction filter of claim 3, wherein the scaled difference is scaled according to a signal level update rate.

5. The noise reduction filter of claim 1, wherein the noise floor block operates to determine a noise floor level based upon a sum of a prior noise floor level and a scaled difference between the short term signal level and the prior noise floor level.

6. The noise reduction filter of claim 5, wherein the scaled difference is scaled according to a noise floor update rate.

7. The noise reduction filter of claim 6, wherein the noise floor update rate is set to a higher value if the short term signal level is greater than the prior noise floor level than if the short term signal level is less than the prior noise floor level.

8. The noise reduction filter of claim 1, wherein the noise factor block operates to calculate a noise factor as a difference between the short term signal level and the noise floor level divided by the short term signal level.

9. A multi-band echo-canceller filter with noise reduction, comprising:

a near-side analysis filter operating to receive a near-side input signal from a near-side conference site and operating to separate the near-side input signal into a first plurality of frequency bands;

a far-side analysis filter operating to receive a far-side input signal from a far-side conference site and to separate the far-side input signal into a second plurality of frequency bands equal in number to the first plurality of frequency bands;

a plurality of summation nodes, each summation node receiving an associated output band of the near-side analysis filter and a second input signal, and each summation node operating to subtract the second input signal from the associated output band;

a plurality of echo canceller filters, each echo canceller filter receiving an associated one of the second plurality of frequency bands from the far-side analysis filter, and each echo canceller filter operating:
  to receive an output of an associated summation node,
  to determine echo present in the output, and
  to provide the second input signal to the associated summing node;

a plurality of noise reduction filters, each noise reduction filter receiving an output signal of an associated summation node, and each noise reduction filter further operating to process the output signal and to provide a noise reduced output signal; and a synthesis filter coupled to each noise reduction filter and receiving the noise reduced output signal of each noise reduction filter, the synthesis filter operating to recombine the noise reduced output signals to provide an output audio signal to a far-side conference site;

wherein each noise reduction filter comprises a filter operating to calculate a noise factor according to an adapting noise floor level such that the noise reduction filter adapts to changing noise levels in the output signal of the associated summation node; and wherein each noise reduction filter comprises:
  a signal analysis block, the signal analysis block operating to receive the output signal of the associated summation node and to determine a short term signal level;
  a noise floor block coupled to the signal analysis block, the noise floor block operating to receive the short term signal level from the signal analysis block and to determine a noise floor level based upon the value of the short term signal level;
  a noise factor block coupled to the signal analysis block and to the noise floor block, the noise factor block operating to receive the short term signal level and the noise floor level and operating to calculate a noise factor; and
  a multiplier node coupled to the noise factor block and receiving the output signal of the associated summation node, the multiplier node operating to multiply the input audio signal by the noise factor and to provide the noise reduced output signal.

10. The multi-band echo-canceller filter of claim 9, wherein the near-side analysis filter operates to split the near-side input signal into thirty-two frequency bands and the far-side analysis filter operates to split the far-side input signal into thirty-two frequency bands.

11. A process for reducing noise in an audio signal comprising:

receiving an input audio signal;

determining a short term signal level of the input audio signal level;

determining a noise floor level based upon the short term signal level and a prior noise floor level;

determining a noise factor based upon the short term signal level and the noise floor level; and generating a noise reduced output signal by multiplying the input audio signal by the noise factor.

12. The process of claim 11 wherein determining a short term signal level comprises calculating a magnitude of the input audio signal by calculating an absolute value of a real and an imaginary portion of the input audio signal.

13. The process of claim 12, wherein determining a short term signal level comprises calculating the short term signal level as a sum of a prior short term signal level and a scaled difference between the magnitude of the input audio signal and the prior short term signal level.

14. The process of claim 13, wherein determining a short term signal level comprises calculating the scaled difference using a signal level update rate as a scaling factor.

15. The process of claim 11, wherein determining a noise floor level comprises calculating the noise floor level as a sum of a prior noise floor level and a scaled difference between the short term signal level and the prior noise floor level.

16. The process of claim 15, wherein determining a noise floor level comprises calculating the scaled difference using a noise floor update rate as a scaling factor.

17. The process of claim 16, wherein determining a noise floor level comprises setting the noise floor update rate to a higher value if the short term signal level is greater than the prior noise floor level than if the short term signal level is less than the prior noise floor level.

18. The process of claim 17, wherein determining a noise factor comprises calculating the noise factor as a difference between the short term signal level and the noise floor level divided by the short term signal level.

* * * * *